(12) United States Patent
Yamanouchi et al.

(10) Patent No.: US 6,785,215 B2
(45) Date of Patent: Aug. 31, 2004

(54) ASTIGMATIC OBJECTIVE LENS FOR OPTICAL HEAD

(75) Inventors: Takashi Yamanouchi, Tokyo (JP); Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 373 days.

(21) Appl. No.: 09/967,998

(22) Filed: Oct. 2, 2001

(65) Prior Publication Data

US 2002/0060973 A1 May 23, 2002

(30) Foreign Application Priority Data

Oct. 6, 2000 (JP) ........................................ 2000-306983

(51) Int. Cl.⁷ .............................................. G11B 7/135
(52) U.S. Cl. ............................ 369/112.23; 369/112.24; 369/121; 369/12.08
(58) Field of Search ....................... 369/112.23, 112.24, 369/121, 112.08, 94

(56) References Cited

U.S. PATENT DOCUMENTS

| | | | |
|---|---|---|---|
| 5,754,504 A | | 5/1998 | Yamazaki et al. ........ 369/44.23 |
| 6,084,843 A | * | 7/2000 | Abe et al. .............. 369/112.07 |
| 6,366,542 B1 | * | 4/2002 | Kojima et al. ........... 369/44.23 |
| 6,480,456 B1 | * | 11/2002 | Kawamura et al. ......... 369/120 |
| 6,654,336 B2 | * | 11/2003 | Kadowaki et al. ...... 369/112.07 |

FOREIGN PATENT DOCUMENTS

JP          11-53759          2/1999

OTHER PUBLICATIONS

English Language Abstract of JP 11–53759.

\* cited by examiner

Primary Examiner—W. R. Young
Assistant Examiner—Michael V Battaglia
(74) Attorney, Agent, or Firm—Greenblum & Bernstein, P.L.C.

(57) ABSTRACT

An objective lens for an optical head converges a first laser beam having a relatively short wavelength and a second laser beam having a relatively long wavelength on first optical disc (DVD) and a second optical disc (CD), respectively. A protective layer of the first disc is thinner than a protective layer of the second optical disc. The objective lens is compensated for astigmatism with respect to the first beam, which is incident on the objective lens as an off-axis beam at a predetermined incident angle, by providing on-axis astigmatism corresponding to wave front aberration greater than or equal to 0.01λ (rms), and the objective lens is configured such that the coma is compensated better in a case where the first laser beam is converged on the first optical disc than in a case where the second laser beam is converged on the second optical disc.

9 Claims, 9 Drawing Sheets

ASTIGMATIC OBJECTIVE LENS FOR OPTICAL HEAD

BACKGROUND OF THE INVENTION

The present invention relates to an objective lens for an optical head employed in an optical disc drive, which is capable of recording/readout data on/from various types of optical discs having different data densities and/or thickness of protective layers.

There are various standards for optical discs. Different optical discs according to different standards may have different data densities, different thickness of protective layers and the like. For example, a CD (compact disc) or a CD-R (compact disc recordable) has a relatively low data density, and the thickness of the protective layer is 1.2 mm. A DVD (digital versatile disc) has a relatively high data density, and the thickness of the protective layer is 0.6 mm.

For data recording/readout of the DVD, it is necessary to use a laser beam having a wavelength of 635–660 nm. For the CD-R, in view of its reflective characteristics, a laser beam having a wavelength of approximately 780 nm is to be used.

Both types of the discs are widely used, and therefore, it is preferable that an optical disc drive is capable of using both discs. Such a disc drive should be provided with two laser diodes which emit laser beams having different wavelengths, for the CD and DVD, as described above. In view of downsizing of the disc drive, it is preferable that an optical system for the disc drive is as compact as possible. In order to reduce the size of the optical system, the two laser diodes maybe incorporated in a single unit (i.e., a laser source unit), and further, an objective lens of the optical head may be configured to function for either of the laser beams having different wavelengths.

When the above-described laser source unit is used, however, the following problem arises.

Generally, two light emitting points of the two laser diodes may be aligned in a direction perpendicular to an optical axis of the objective lens. Therefore, there exists an angular difference between the beams incident on the objective lens. That is, at least one of the laser beams emitted by the two light emitting points is incident on the objective lens as an off-axial beam.

The optical system is preferably compensated with respect to aberrations for the two different laser beams having different wavelengths. However, since the thickness of the protective layers of the two discs are different, coma cannot be compensated completely. If, for example, the coma is not completely compensated with respect to a laser beam, which is used for one of the discs and incident on the objective lens as a off-axial light beam, a beam spot formed by the beam on the disc is not made sufficiently small, and therefore, data recording/readout on the disc may not be performed.

Further, a structure of a laser emitting device becomes larger as a required output is larger. If the structure is larger, a distance between the laser emitting points should also be longer. Accordingly, if the relatively high intensity is required in the above-described type optical head in order to improve a data recording/readout speed, the distance between the light emitting points becomes longer. In such a case, a difference between the incident angles of the laser beams with respect to the objective lens becomes larger. Therefore, at least one of the laser beams, which is incident on the objective lens as an off-axial beam, is incident on the objective lens at a relatively large incident angle. Then, relatively large aberrations are caused, and data recording/readout operation may not be performed.

SUMMARY OF THE INVENTION

It is therefore an object of the present invention to provide an improved objective lens for an optical disc drive employing a laser source unit accommodating two laser diodes emitting laser beams having different wavelengths. The objective lens is configured to suppress occurrence of aberrations, and forms appropriate beam spots on a plurality of optical discs based on different standards. The invention further provides an improved optical head provided with the improved objective lens, and optical disc drive employing such an optical head.

For the above object, according to the present invention, there is provided an objective lens for an optical head. The objective lens converges first and second laser beams on first and second optical discs, respectively. The first laser beam has a shorter wavelength than the second laser beam, and a protective layer of the first disc is thinner than a protective layer of the second optical disc. The objective lens is compensated for astigmatism with respect to the first beam, which is incident on the objective lens as an off-axis beam at a predetermined incident angle, by providing on-axis astigmatism corresponding to wave front aberration greater than or equal to $0.01\lambda$ (rms), and the objective lens is configured such that the coma is compensated better in a case where the first laser beam is converged on the first optical disc than in a case where the second laser beam is converged on the second optical disc.

With this configuration, the wave front aberration of the objective lens when the first optical disc is used exhibits the maximum value when a beam is incident in parallel with the optical axis, and the minimum value when the beam is incident at predetermined incident angles (the same absolute value with positive/negative signs). Therefore, by adjusting the magnitude of the astigmatism so that the wave front aberration when the beam is incident in parallel with the optical axis does not exceed the allowable range, an range of the incident angle at which the wave front aberration does not exceed the allowable range, can be expanded.

Further, for the second optical disc, it is not necessary to form the beam spot so small as for the first optical disc. That is, the NA can be relatively small. In this case, the effect of the coma and the astigmatism by the off-axis beam onto the wave front aberration is relatively small. Therefore, even if the coma is not compensated, it is possible to enhance the range of the incident angle at which the wave front aberration does not exceed the allowable range.

When the above-described objective lens is used, if the shorter wavelength laser beam is incident on the objective lens at an incident angle at which the astigmatism has the minimum value for the first optical disc, it becomes possible to suppress the wave front aberration within an allowable range, for the second optical disc, even if the beam is not incident in parallel with the optical axis of the objective lens.

Optionally, the objective lens may be an infinite-conjugate system that receives the first and second laser beam as the parallel light fluxes and converges the received parallel light fluxes on the first and second optical discs, respectively.

Further optionally, the objective lens may be formed with a diffraction lens structure on one of refraction surfaces of the objective lens, the diffraction lens structure being configured such that spherical aberration is changed in an under corrected direction as a wavelength of a beam passing therethrough increases.

According to another aspect of the invention, there is provided an optical head for an optical disc drive, including a first laser diode that emits a first laser beam, a second laser diode that emits a second laser beam, a wavelength of the first laser beam being shorter than a wavelength of the second laser beam, and an objective lens that converges the first and second laser beams on first and second optical discs, respectively, a protective layer of the first disc being thinner than a protective layer of the second optical disc.

The objective lens is compensated for astigmatism with respect to the first beam, which is incident on the objective lens as an off-axis beam at a predetermined incident angle, by providing on-axis astigmatism corresponding to wave front aberration greater than or equal to $0.01\lambda$ (rms).

Further, the objective lens is configured such that the coma is compensated better in a case where the first laser beam is converged on the first optical disc than in a case where the second laser beam is converged on the second optical disc.

Furthermore, the first laser diode and the second laser diode are arranged such that converging points, on which the first laser beam and the second laser beam are converged by the objective lens, are aligned in a direction in which one of two focal lines, which would be formed when light fluxes parallel with the optical axis of the objective lens are incident on the objective lens, closer to the objective lens extends.

Optionally, the first laser diode and the second laser diode are incorporated in a single unit.

Further, it is preferable that light emitting points of the first and second laser diodes are aligned at off-axis positions with respect to the optical axis of the objective lens.

According to a further aspect of the invention, there is provided an optical disc drive, which is provided with a spindle motor that is capable of rotating either one of a first optical disc and a second optical disc, an optical head and a head driving mechanism.

The optical head includes a first laser diode that emits a first laser beam, a second laser diode that emits a second laser beam, a wavelength the first laser beam being shorter than a wavelength of the second laser beam, and an objective lens that converges the first and second laser beams on first and second optical discs, respectively, a protective layer of the first disc being thinner than a protective layer of the second optical disc.

The objective lens is compensated for astigmatism with respect to the first beam, which is incident on the objective lens as an off-axis beam at a predetermined incident angle, by providing on-axis astigmatism corresponding to wave front aberration greater than or equal to $0.01\lambda$ (rms).

Further, the objective lens is configured such that the coma is compensated better in a case where the first laser beam is converged on the first optical disc than in a case where the second laser beam is converged on the second optical disc. Furthermore, the first laser diode and the second laser diode are arranged such that converging points, on which the first laser beam and the second laser beam are converged by the objective lens, are aligned in a direction in which one of two focal lines, which would be formed when light fluxes parallel with the optical axis of the objective lens are incident on the objective lens, closer to the objective lens extends.

The head driving mechanism drives at least a part of the optical head in a radial direction of the one of the first and second optical disc. An extending direction of the focal line closer to the objective lens coincides with a tangential line to the one of the first and second optical disc.

DESCRIPTION OF THE EMBODIMENT

Hereinafter, an optical disc drive, an optical head for the optical disc drive, and an objective lens for the optical head will be described with reference to the drawings.

Figure 1:
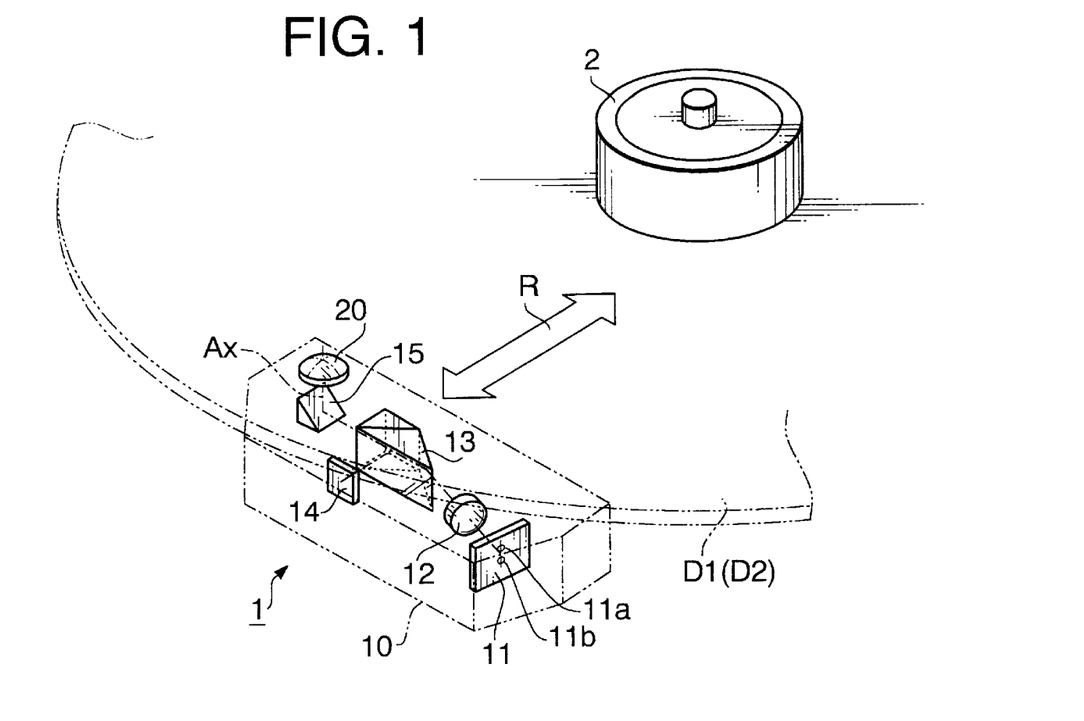
FIG. 1 schematically shows a perspective view of a part of an optical disc drive according to an embodiment of the invention.
Figure 2:
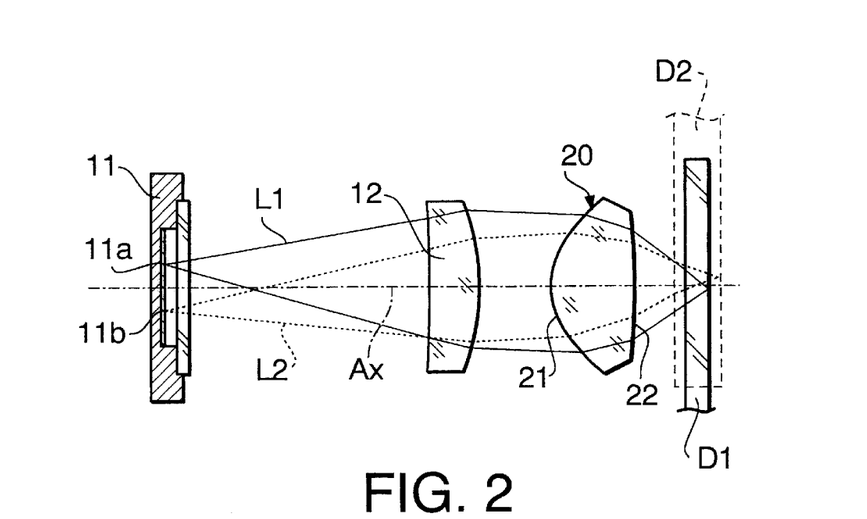
FIG. 2 shows an optical system of an optical head with its optical path being developed.

FIG. 1 schematically shows a perspective view of a part of an optical disc drive 1 according to an embodiment of the invention, and FIG. 2 shows an optical system of an optical head 10 with its optical path being developed.

In the following description, two types of optical discs: a first optical disc D1; and a second optical disc D2 will be referred to. The first optical disc D1 has a relatively high data density, and has a protective layer which is 0.6 mm thick. An example of the first optical disc D1 is a DVD (digital versatile disc). The second optical disc D2 has a relatively low data density, and has a protective layer of 1.2 mm thick. An example of the second optical disc D2 is a CD (compact disc) or CD-R (CD recordable).

The optical disc drive 1 is capable of performing data recording/readout with respect to either of the first and second optical discs D1 and D2.

As shown in FIG. 1, the optical disc drive 1 includes a spindle motor 2 for rotating the optical disc D1 or D2, and the optical head 10. The optical head 10 is configured to be movable in a radial direction (indicated by arrow R) by a not-shown driving mechanism.

The optical head 10 includes a laser module 11, a collimating lens 12, a beam shaping/splitting prism 13, a sensor 14, a mirror 15 and an objective lens 20.

The laser module 11 accommodates first and second laser diodes 11a and 11b respectively emitting laser beams having different wavelengths. The collimating lens 12 collimates each of the laser beams emitted by the laser diodes 11a and 11b. The beam shaping/splitting prism 13 adjusts the cross-sectional shape of the beams emitted by the laser diodes 11a and 11b. The beam shaping/splitting prism 13 also functions to split the received beam to components respectively directed to the optical disc and to the sensor 14, which is used for monitoring the intensity of the emitted beam. The mirror 15 reflects the light component passed through the prism 13 toward the disc D1 or D2 through the objective lens 20, which converges the laser beam emerging from the prism 13 to converge on the optical disc D1 or D2.

The laser diodes 11a and 11b are incorporated in the module, which are closely aligned with respect to each other. The light emitting points of the laser diodes 11a and 11b are aligned on opposite sides with respect to the optical axis Ax of the objective lens 20. Thus, both the first and second laser beams emitted by the first and second laser diodes 11a and 11b are incident on the objective lens as off-axial beams. It should be noted that the first and second laser diodes 11a and 11b are arranged such that beam spots formed by the laser beams emitted by the laser diodes 11a and 11b are aligned in a direction parallel to a tangential line to the disc D1 or D2.

The first laser diode 11a emits the first laser beam L1 (indicated by solid lines in FIG. 2), whose wavelength is 657 nm, when the first optical disc D1 is used. The second laser diode 11b emits the second laser beam L2 (indicated by broken lines in FIG. 2), whose wavelength is 790 nm, when the second optical disc D2 is used. The laser beams L1 and L2 are emitted by the first and second laser diodes 11a and 11b, respectively, as diverging fluxes, which are collimated by the collimating lens 12 and converted into parallel fluxes. The collimated laser beam L1 or L2 is converged by the objective lens 20 and forms a beam spot on a data recording surface of the optical disc D1 or D2, through the beam shaping/splitting prism 13 and mirror 15.

It should be noted that, in FIG. 2, the beam shaping/splitting prism 13 and the mirror 15 are not shown for the sake of simplicity.

Further, in FIG. 2, both the beams L1 and L2 as well as both the optical disc D1 and D2 are shown in an overlaid manner. However, in practical use, only on of the optical discs D1 and D2 is used at a time, and one of the laser beams L1 and L2 is used in accordance with the used optical disc. That is, when the first disc D1 is used, the first laser diode 11a is actuated to emit the laser beam L1 having a wavelength of 657 nm, and when the second disc D2 is used, the second laser diode 11b is actuated to emit the second laser beam L2 having a wavelength of 790 nm.

The laser beam L1 or L2 is reflected by the optical disc D1 or D2, and incident on the objective lens 20. The reflected beam is converted to the parallel light fluxes by the objective lens 20, enters the collimating lens 12 and is converged thereby, and is directed to the laser module 11 through a composite optical element. A composite optical element, which is not shown in FIG. 1, is arranged between the beam shaping/splitting prism 13 and the objective lens 20, and divides the reflected beam and directs the divided components to a plurality of light receiving devices, which is provided in the laser module 11, for receiving the divided beams and detecting a focusing error signal, a tracking error signal, and a reproducing signal.

Specifically, for the detection of the focusing error signal, a so-called double knife edges method is employed, and a so-called phase difference method or a push-pull method is employed for the detection of the tracking error signal. With this configuration, either of the DVD, CD and CD-R can be used. The above-described signal detection methods are well-known, and an example of such methods is described in Japanese Patent Provisional Publication HEI 11-53759.

In the optical head 10, an actuator (not shown) is provided for driving the objective lens 20 so that the beam spot is accurately positioned on a data track of the optical disc based on the focusing error signal and the tracking error signal.

Figure 3A:
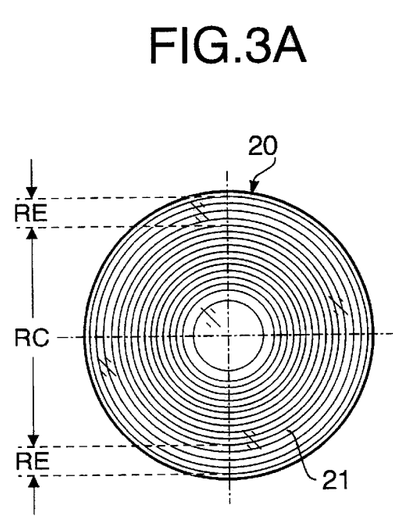
FIG. 3A shows a front view of an objective lens.
Figure 3B:
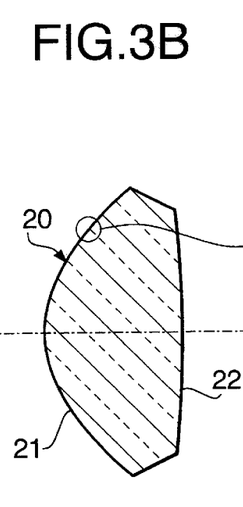
FIG. 3B is a cross-sectional side view of the objective lens shown in FIG. 3A.
Figure 3C:
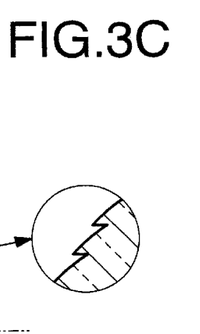
FIG. 3C is a partially enlarged cross-sectional side view of the objective lens shown in FIG. 3A.

FIGS. 3A–3C show the structure of the objective lens 20. FIG. 3A shows a front view, FIG. 3B shows a cross-sectional side view, and FIG. 3C shows a partially enlarged cross-sectional side view of the objective lens 20.

As shown in FIGS. 3A–3C, the objective lens 20 is a biconvex, single element lens. A first surface 21, which is on the collimating lens side, is a rotationally symmetrical aspherical surface formed with a diffraction lens structure. A second surface 22, which is on the optical disc side, is a modified toric surface, whose power is different depending on a position and direction. Specifically, the modified toric surface is a curved surface which is asymmetric with respect to the optical axis, and a cross section thereof along a principal meridian is not an arc.

On the first surface 21 of the objective lens 20, the diffraction lens structure is formed. The diffraction lens structure includes a plurality of annular zones concentric with respect to the optical axis of the objective lens 20 as shown in FIG. 3A. At boundaries of the annular zones, stepped portions extending in a direction parallel to the optical axis are formed, as in the well-known Fresnel lens structure.

The first surface 21 of the objective lens is divided into a common area RC and a high NA (numerical aperture) exclusive area RE which surrounds the common area RC. The common area RC is an area through which a light beam forming a beam spot on the second disc D2 passes. Since the data density of the second disc D2 is relatively low, a relatively low NA (numerical aperture) is sufficient for the second disc D2. The high NA exclusive area RE is an area through which a light beam forming a beam spot on the first disc D1 passes. Since the data density of the first disc D1 is relatively high, a relatively high NA is required for the first disc D1. In this embodiment, the diffraction lens structure is formed over an entire area of the first surface 21, including the common area RC and the high NA exclusive area RE.

The diffraction lens structure formed on the first surface 21 has a characteristic such that the spherical aberration is changed to an under corrected direction as the wavelength of the beam passing through the diffraction lens structure increases. The spherical aberration of the optical head generally changes in an over corrected direction when the thickness of the protective layer of an optical disc increases. Further, for the first disc D1, which has a relatively thin protective layer, a laser beam having a shorter wavelength is used, and for the second disc D2, which has a relatively thick protective layer, a laser beam having a longer wavelength is used.

In the embodiment, the diffraction lens structure is corrected for the spherical aberration with respect to the first laser beam L1. Since the spherical aberration provided by the diffraction lens structure changes in the under corrected direction when the wavelength increases, the spherical aberration which is changed in the over corrected direction when the disc is changed from the second disc D2 to the first disc D1 can be cancelled by the spherical aberration provided by the diffraction lens structure.

Further, since the second surface 22 is formed as the modified toric surface, the objective lens 20 provides a predetermined astigmatism with respect to the light which is orthogonally (i.e., parallel with the optical axis Ax) incident on the objective lens 20. Specifically, the objective lens 20 provides astigmatism corresponding to the wave front aberration of $0.01\lambda$ [rms] or more when the first laser beam L1 emitted by the first laser diode 11a is converged on the first disc D1, thereby astigmatism with respect to the off-axis beam, which is incident on the objective lens 20 at a predetermined incident angle, being compensated for.

It is preferable that the astigmatism provided by the objective lens 20 is equal to or less than the amount corresponding to the wavefront aberration of $0.05\lambda$ [rms]. The change of the astigmatism is proportional to a square of the incident angle of a beam. When the astigmatism exceeds the upper limit, if there is a positional error between the laser diodes and the collimating lens, and if the incident angle of a beam with respect to the objective lens is different from the designed value, the astigmatism may vary excessively. Therefore, if the astigmatism to be provided by the objective lens 20 exceeds the upper limit, an assembling error must be suppressed, and accordingly, each optical element must be positioned at high accuracy.

Further, the objective lens 20 is configured such that coma is provided for the off-axis rays of the second beam L2. Therefore, the incident angle of the second laser beam cannot be set relatively large, and the laser diode 11b is located substantially on the optical axis of the objective lens 20. In such a case, the wavefront aberration is inversely proportional to the wavelength, and proportional to the square of NA. Under this condition, if the on-axis astigmatism for the laser beam L1 exceeds the amount corresponding to the wave front aberration of $0.05\lambda$ [rms], the astigmatism for the laser beam L2 exceeds the amount corresponding to the wave front aberration of $0.027\lambda$ [rms]. It is not preferable that the astigmatism becomes too large, and therefore, it is preferable that the astigmatism does not exceed the upper limit.

Figure 4:
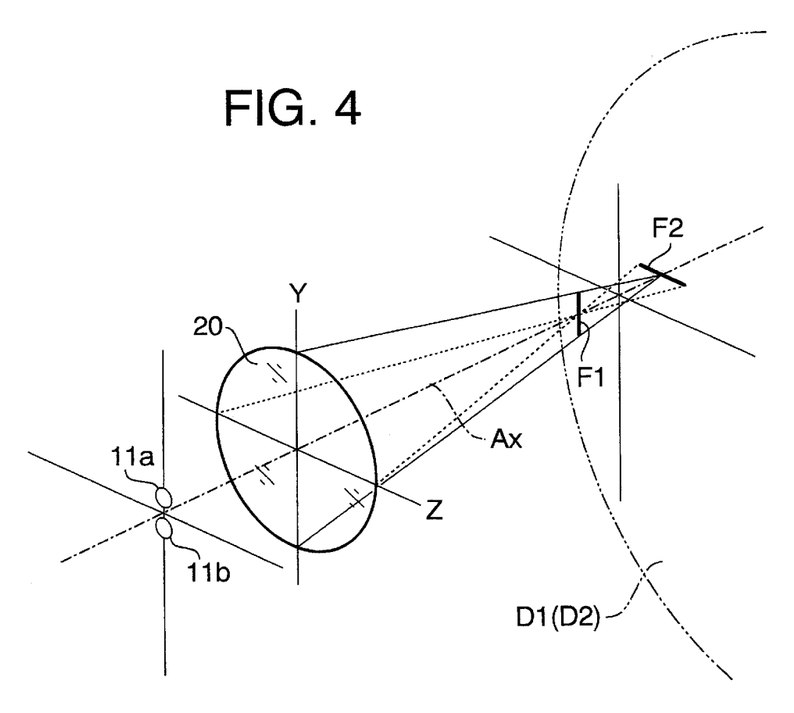
FIG. 4 is a perspective view showing astigmatism generated by the objective lens according to the embodiment.

The direction of the astigmatism is illustrated in relation to the arrangement of the laser diodes 11a and 11b, and the optical discs D1 and D2 in FIG. 4.

In FIG. 4, Y-axis and Z-axis, which are on a same plane and perpendicular to each other, and perpendicular to the optical axis Ax, are indicated. The objective lens 20 is configured such that a positive power in the Z-axis direction is greater than a positive power in the Y-axis direction. Therefore, light fluxes incident on the objective lens 20 along the direction parallel to the optical axis Ax form a first focal line F1 closer to the objective lens 20 and extends in the Y-axis direction, and a second focal line F2 farther from the objective lens 20 than the first focal line F1 and extends in the Z-axis direction.

The first and second laser diodes 11a and 11b are arranged such that the light converging points of the beams respectively emitted by the first and second laser diodes 11a and 11b are aligned in the direction of the first focal line F1, i.e., in the Y-axis direction. Further, the optical head 10 is positioned such that the first focal line F1 extends in parallel with the tangential line of the optical disc D1 or D2.

Further, the objective lens 20 is designed such that the coma when the laser beam emitted by the first laser diode 11a is converged on the first disc D1 is well compensated for in comparison with a case where the laser beam emitted by the second laser diode 11b is converged on the second disc D2.

If the spherical aberration is compensated with respect to the first and second discs D1 and D2 using the above-described diffraction lens structure, the coma cannot be compensated for both discs D1 and D2. Accordingly, in the embodiment, only for the first optical disc D1, which requires a relatively large NA, the coma is compensated.

If the coma is compensated in regard with the first optical disc D1, the change of the wave front aberration due to the change of the incident angle substantially depends on the astigmatism. Therefore, if the astigmatism is compensated with respect to an off-axis beam incident on the objective lens 20 at a predetermined incident angle, the wavefront aberration of the off-axis beam incident at the predetermined angle can be suppressed to a small amount. However, the astigmatism can be compensated only in a direction along the first focal line F1, i.e., in the Y-axis direction, and if the incident angle of the incident beam has a Z-axis component, the astigmatism increases. Therefore, the two light converging points should be aligned along the Y-axis, and accordingly, the first and second laser diodes 11a and 11b should also be aligned along the Y-axis direction.

For the second optical disc D2, it is not necessary to reduce the size of the beam spot as small as that for the first optical disc D1, and therefore the NA can be relatively small. Thus, even if the coma is not compensated, a relatively wide range of the incident angle of a beam can be set without exceeding the allowable wave front aberration. Therefore, if the first laser diode 11a is aligned so that the laser beam is incident on the objective lens 20 at an incident angle, at which the astigmatism has a minimum value, even though the laser beam emitted by the second laser diode 11b is incident on the objective lens 20 at a certain angle (i.e., not orthogonally), the wave front aberration can be within an allowable range. As above, for both discs, the wavefront aberration is suppressed within an allowable range.

When a direction in which the two light converging points are aligned (i.e., the direction of the first focal line F1) is aligned with the tangential line to the optical discs D1 and D2, a light receiving element that receives the light beam emitted by the first laser diode 11a and reflected by the optical disc D1, and another light receiving element that receives the light beam emitted by the second laser diode 11b and reflected by the optical disc D2 can be arranged spaced from each other.

In order to detect the tracking error signal, at least one pair of light receiving elements should be provided along a direction corresponding to a radius of each optical disc spaced from each other. Therefore, if the laser diodes 11a and 11b are aligned along the radial direction, at least four light receiving elements should be aligned on a line extending in a direction corresponding to the radius of an optical disc. Such an arrangement is difficult to configure since the f our light receiving elements may interfere with each other. If the laser diodes 11a and 11b are aligned in a direction parallel with the tangential line to the optical disc, such a deficiency is resolved.

The astigmatism is compensated only in a direction along the first focal line F1 (i.e., Y-axis direction). Therefore, if the optical head is a finite system, and the incident angle changes when the objective lens moves in the radial direction (Z-axis direction) for tracking, a relatively large astigmatism may be generated and the wavefront aberration may exceeds the allowable range. In such a system, a necessary movable range for tracking cannot be covered.

In the embodiment, parallel light fluxes are incident on the objective lens 20, and the objective lens 20 is configured as an infinite-conjugate system. Therefore, even if the objective lens 20 is moved in the radial direction for tracking, the incident angle of a beam is unchanged, and the astigmatism is not generated. Accordingly, a sufficient movable range of the objective lens 20 for tracking can be obtained without exceeding the allowable range of the wavefront aberration.

Figure 5:
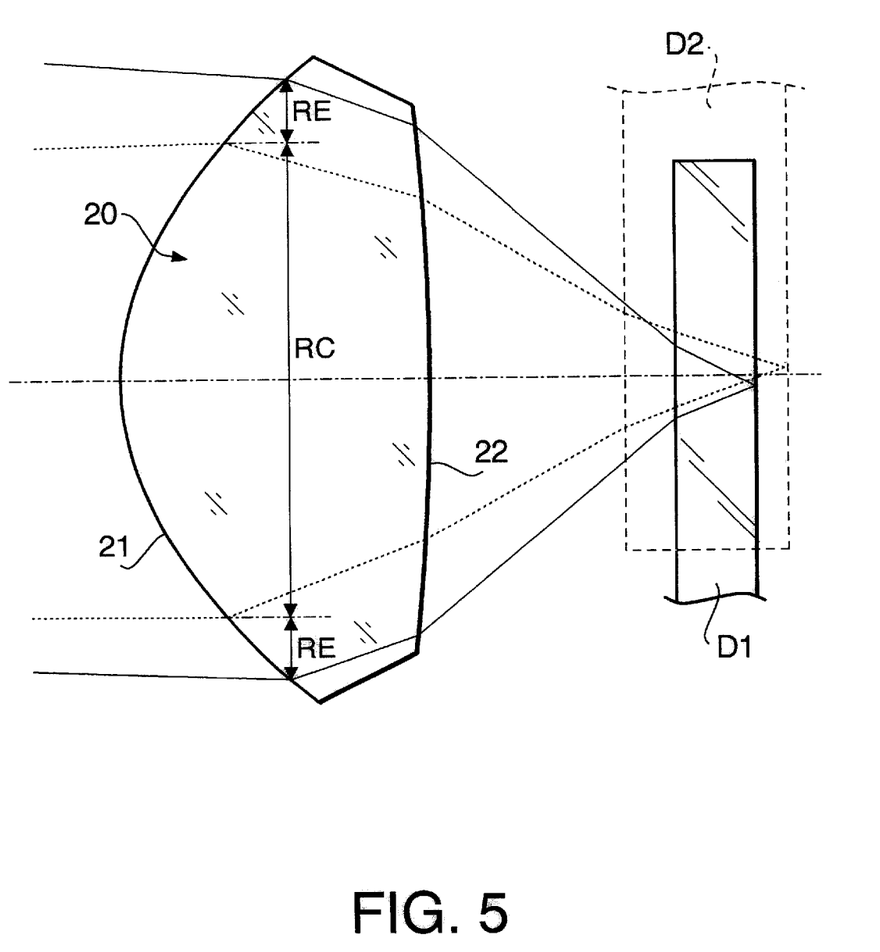
FIG. 5 shows a cross-sectional view of the objective lens and optical discs according to the embodiment.

A numerical embodiment of the objective lens 20 will be described. FIG. 5 shows the objective lens 20, and the first and second optical discs D1 and D2. The numerical values are indicated in TABLE 1.

In the embodiment, the first surface 21 of the objective lens 20 is divided into the common area RC and the high NA exclusive area RE. The common area RC is defined as an area where $0 \leq h < 1.69$ (mm), and the high NA exclusive area RE is defined as an area where $1.69 \leq h$, wherein h represents a height with respect to the optical axis of the objective lens 20. In the common area RC and the high NA exclusive area RE, diffraction lens structures defined by different optical path length difference functions are formed. Further, a base curve (a shape of a lens surface excluding the diffraction lens structure) of the common area RC and that of the high NA exclusive area RE are different aspherical surfaces defined by different coefficients. The second surface 22 of the objective lens 20 is a modified toric surface which is not formed with a diffraction lens structure.

Specifically, the shape of the rotationally symmetrical aspherical surface forming the base curve of the first surface 21 is defined by the following equation:

$$X(h) = \frac{Ch^2}{1 + \sqrt{1 - (1+K)C^2h^2}} + A_4h^4 + A_6h^6 + A_8h^8 A_{10}h^{10} + A_{12}h^{12}$$

where,

X(h) is a SAG, that is, a distance of a point on a surface, whose height from the optical axis is h, with respect to a plane tangential at the optical axis;

C represents a curvature (1/r) of the aspherical surface on the optical axis;

K is a conical constant; and $A_4, A_6, A_8, A_{10}$ and $A_{12}$ are aspherical surface coefficients of fourth, sixth, eighth, tenth and twelfth orders, respectively.

The shape (i.e., the modified toric surface) of the second surface 22 is defined by the following equation:

$$X(Y, Z) = \frac{CyY^2 + CzZ^2}{1 + \sqrt{1 - (1+K)(Cy^2Y^2 + CzZ^2)}} + A_4h^4 + A_6h^6 + A_8h^8 A_{10}h^{10} + A_{12}h^{12}$$

where,

X(X,Y) is a SAG, that is, a distance of a point on a surface, whose Y and Z coordinates are (Y, Z), with respect to a plane tangential at the optical axis;

Cy and Cz represent curvature of the surface, on the optical axis, in the Y-axis and Z-axis directions, respectively;

K is a conical constant;

$A_4, A_6, A_8, A_{10}$ and $A_{12}$ are aspherical surface coefficients of fourth, sixth, eighth, tenth and twelfth orders, respectively; and h is $\sqrt{Y^2 + Z^2}$.

An additional optical path length $\phi(h)$, which is added by the diffractive lens structure, is expressed by the following optical path difference function:

$$\phi(h) = (P_2h^2 + P_4h^4 + P_6h^6 + \ldots) \times m \times \lambda$$

where, $P_2$, $P_4$ and $P_6$ are coefficients of second, fourth and sixth orders;

h represents a height from the optical axis;

m represents a diffraction order; and

λ represents a working wavelength. The optical path difference $\phi(h)$ indicates a difference between an optical path length of a hypothetical ray of light which does not pass through the diffractive lens structure and an optical path length of a ray of light which is diffracted by the diffraction lens structure, at the height h from the optical axis. In other words, the optical path difference $\phi(h)$ represents the additional optical path length of each ray of light which is diffracted by the diffractive lens structure. The positive sign of the added length represents that the optical path length on the optical axis is elongated.

The actual microscopic shape of the diffraction lens structure is determined by removing an integer multiple of the wavelength λ from the optical path difference $\phi(h)$. That is, a width of each annular zone is determined such that, when the first order diffraction light is used, the inner side of the annular zone and the outer side of the annular zone has an optical path difference of one wavelength, and a step between adjoining annular zones provide an optical path length difference of one wavelength to the incident light.

In TABLE 1, coefficients defining the base curve of the common area RC and the diffraction lens structure in the common area RC, and the base curve of the high NA exclusive area RE and the diffraction lens structure in the high NA exclusive area RE, a distance between surfaces, refractive indexes for used wavelengths, coefficients defining the second surface 22 are indicated.

In TABLE 1, $NA_1$, $f_1$ and $\lambda_1$ are the numerical aperture, the focal length of the objective lens 20 (unit: mm) and the wavelength (unit: nm) when the first disc D1 is used, respectively. Further, $NA_2$, $f_2$, and $\lambda_2$ are the numerical aperture, the focal length of the objective lens 20 (unit: mm) and the wavelength (unit: nm) when the second disc D2 is used, respectively.

TABLE 1

| $NA_1$ = 0.65 | $f_1$ = 3.360 | $\lambda_1$ = 657 |
| $NA_2$ = 0.50 | $f_2$ = 3.384 | $\lambda_2$ = 790 |

| | First surface | | |
|---|---|---|---|
| | Common area ($0 \leq h < 1.69$) | High-NA exclusive area ($1.69 \leq h < 2.18$) | Second surface |
| r | 2.101 | 2.129 | ry: −8.450 |
| | | | rz: −8.446 |
| κ | −0.500 | −0.500 | 0.00 |
| $A_4$ | −1.81100 × 10⁻³ | −6.72000 × 10⁻⁴ | 1.60200 × 10⁻² |

TABLE 1-continued

| | | | |
|---|---|---|---|
| $A_6$ | $-2.44900 \times 10^{-4}$ | $-1.46200 \times 10^{-5}$ | $-3.26800 \times 10^{-3}$ |
| $A_8$ | $-1.75000 \times 10^{-5}$ | $-8.69200 \times 10^{-5}$ | $1.29900 \times 10^{-4}$ |
| $A_{10}$ | $-3.51400 \times 10^{-6}$ | $2.19000 \times 10^{-5}$ | $3.20300 \times 10^{-5}$ |
| $A_{12}$ | $-2.56000 \times 10^{-6}$ | $-5.36100 \times 10^{-6}$ | $-3.74500 \times 10^{-6}$ |
| $P_2$ | 0.0 | $-2.56044$ | — |
| $P_4$ | $-1.65300$ | $-0.80000$ | — |
| $P_6$ | $-0.15050$ | $-0.09000$ | — |
| $P_8$ | 0.0 | 0.00 | — |
| $P_{10}$ | 0.0 | 0.00 | — |
| $P_{12}$ | 0.0 | 0.00 | — |

| | |
|---|---|
| d (distance between first and second surfaces) | 2.210 |
| n657 (refractive index when wavelength is 657 nm) | 1.54059 |
| n790 (refractive index when wavelength is 790 nm) | 1.53653 |

Figure 6A:
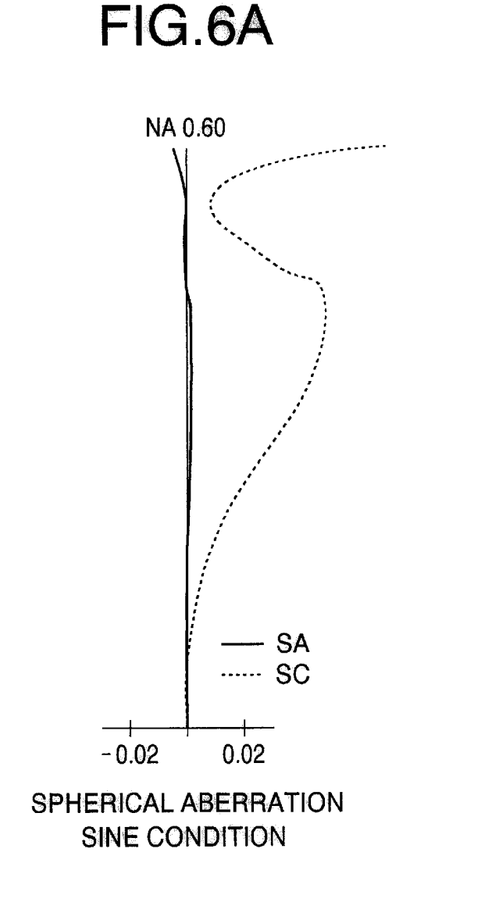
FIG. 6A is a graph showing spherical aberration and sine condition of the objective lens when a beam having a first wavelength is used.
Figure 6B:
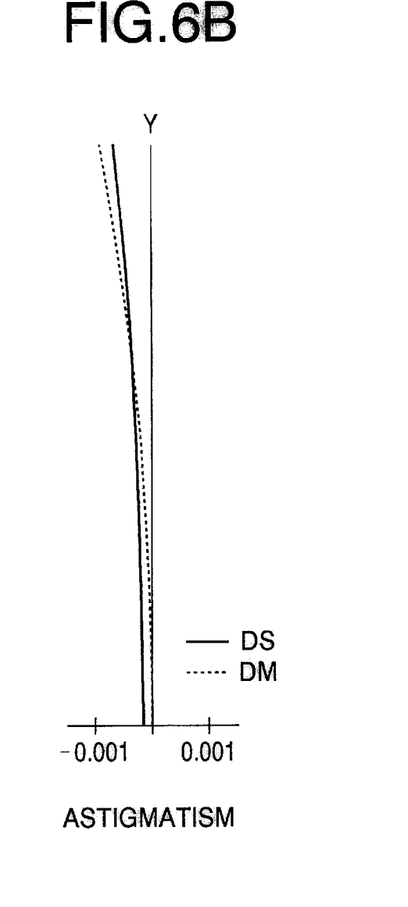
FIG. 6B is a graph showing astigmatism of the objective lens when a beam having the first wavelength is used.

FIG. 6A shows a spherical aberration SA and a sine condition SC of the objective lens according to the embodiment, with respect to the first optical disc D1, at the wavelength of 657 nm. FIG. 6B shows astigmatism (DS: sagittal; DM: meridional) when the first disc D1 is used. The horizontal axis indicates the quantity of aberrations (unit: mm), and the vertical axis of FIG. 6A represents the NA, that of FIG. 6B represents an image height Y in the Y-axis direction.

Figure 7:
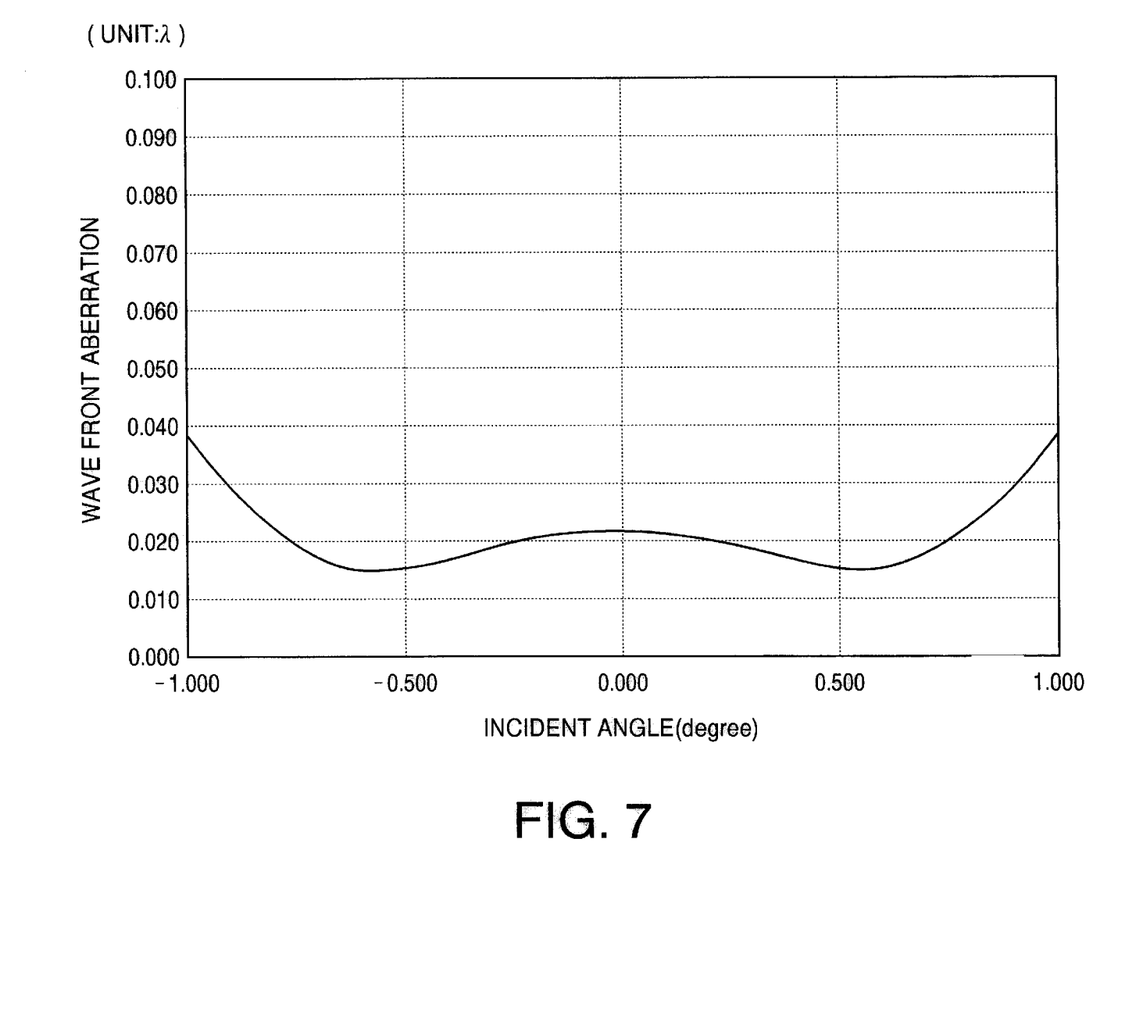
FIG. 7 shows a relationship between an angle of incidence of a beam with respect to the objective lens and wave front aberration when a first disc is used.

FIG. 7 shows a relationship between an angle of incidence of a beam emitted by the first laser diode 11a with respect to the objective lens 20 and wave front aberration (rms value) when the first disc D1 is used. For the first optical disc D1, astigmatism is compensated with respect to an off-axis beam having a predetermined incident angle, and further coma is also compensated. Thus, the wave front aberration has the maximum value of $0.022\lambda$ when a beam is incident orthogonally (incident angle: 0°), and has the minimum value of $0.016\lambda$ when the incident angle is ±0.58°. The wave front aberration reaches $0.030\lambda$ at the incident angle of ±0.88°, and within this range of ±0.88°, the wave front aberration is suppressed within the allowable range.

Figure 8:
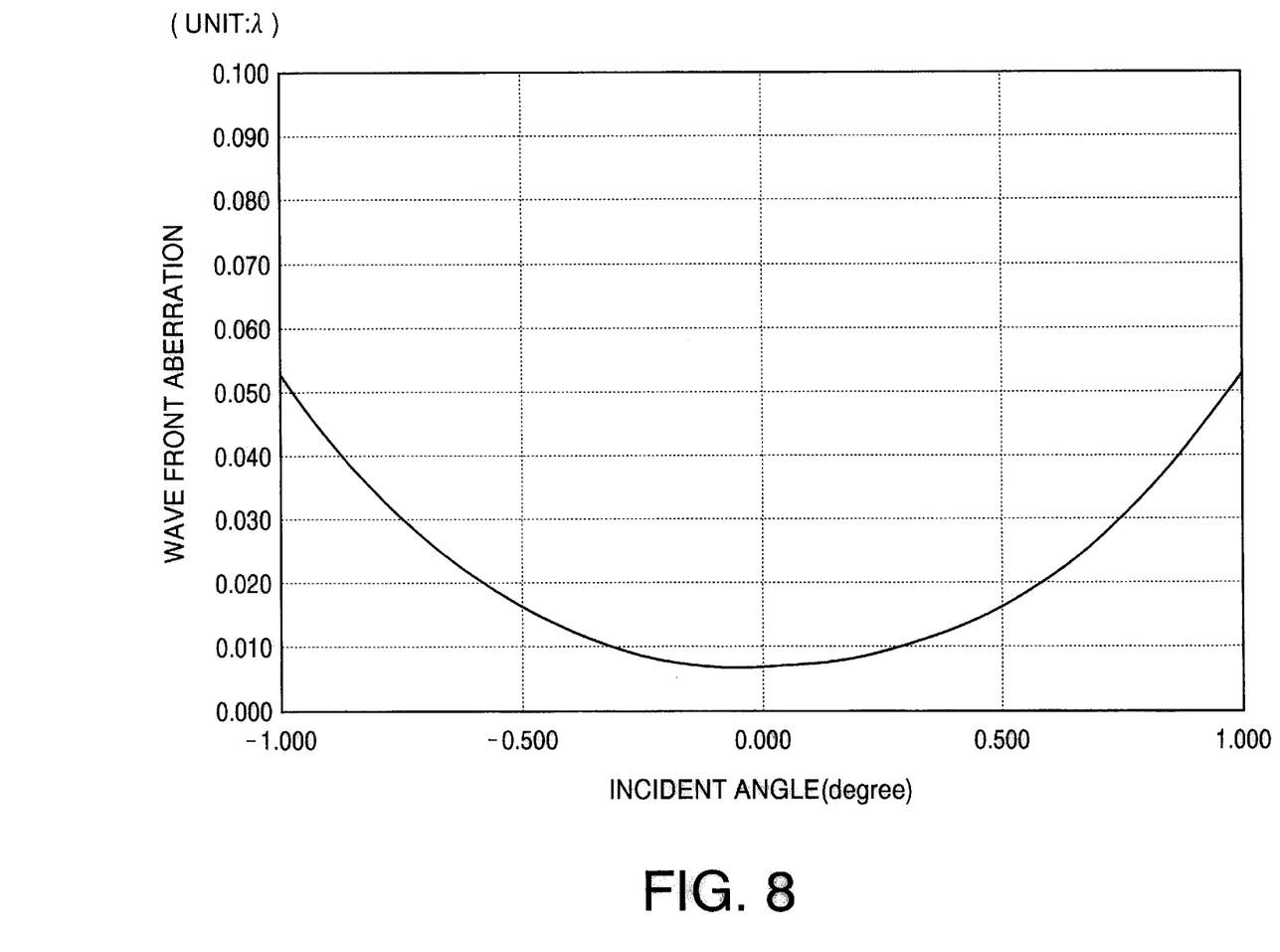
FIG. 8 shows a relationship similar to FIG. 7 except that on-axis astigmatism is removed.

If the objective lens 20 is configured not to provide the astigmatism, the wave front aberration for the first disc D1 is as shown in FIG. 8. In this case, the wave front aberration reaches the upper limit of $0.030\lambda$ when the incident angle is ±0.73°.

It is understood, by comparing FIG. 7 with FIG. 8, that the range of the incident angle, at which the wave front aberration is suppressed within the allowable range, can be expanded by providing the on-axis astigmatism to the objective lens 20.

Figure 9A:
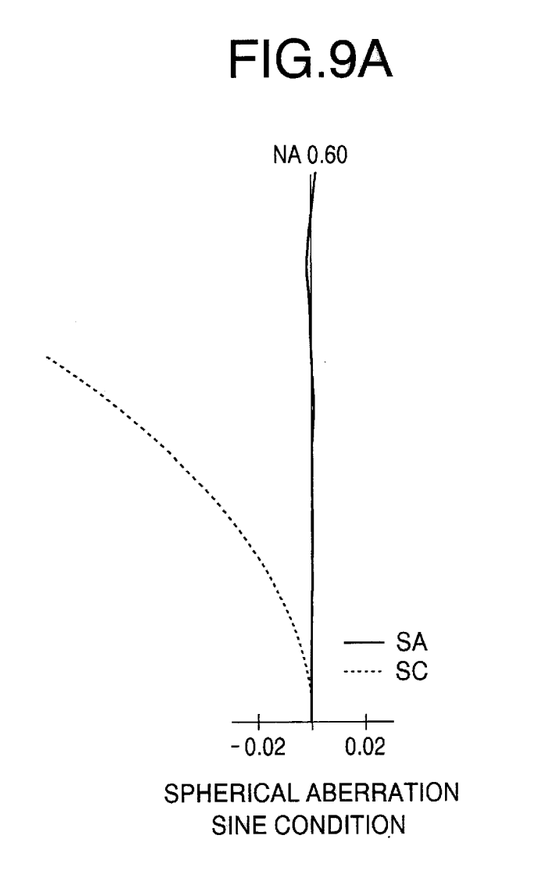
FIG. 9A is a graph showing spherical aberration and sine condition of the objective lens when a beam having a second wavelength is used.
Figure 9B:
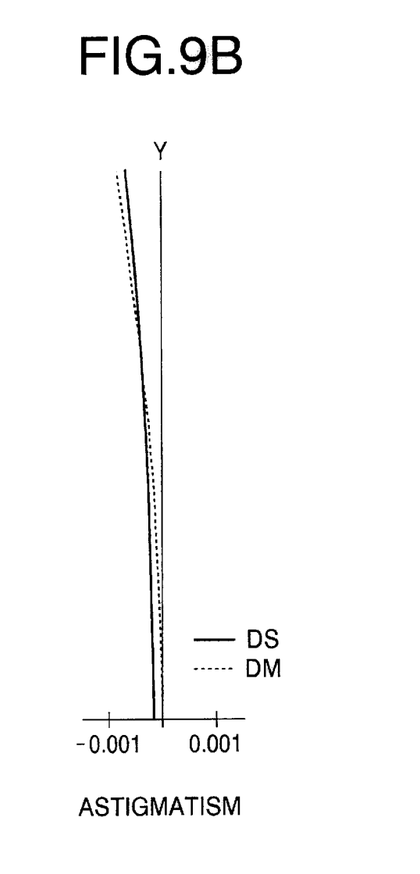
FIG. 9B is a graph showing astigmatism of the objective lens when a beam having the second wavelength is used.

FIG. 9A shows a spherical aberration SA and a sine condition SC of the objective lens according to the embodiment, with respect to the second optical disc D2, at the wavelength of 790 nm. FIG. 9B shows astigmatism (DS: sagittal; DM: meridional) when the second disc D2 is used.

Figure 10:
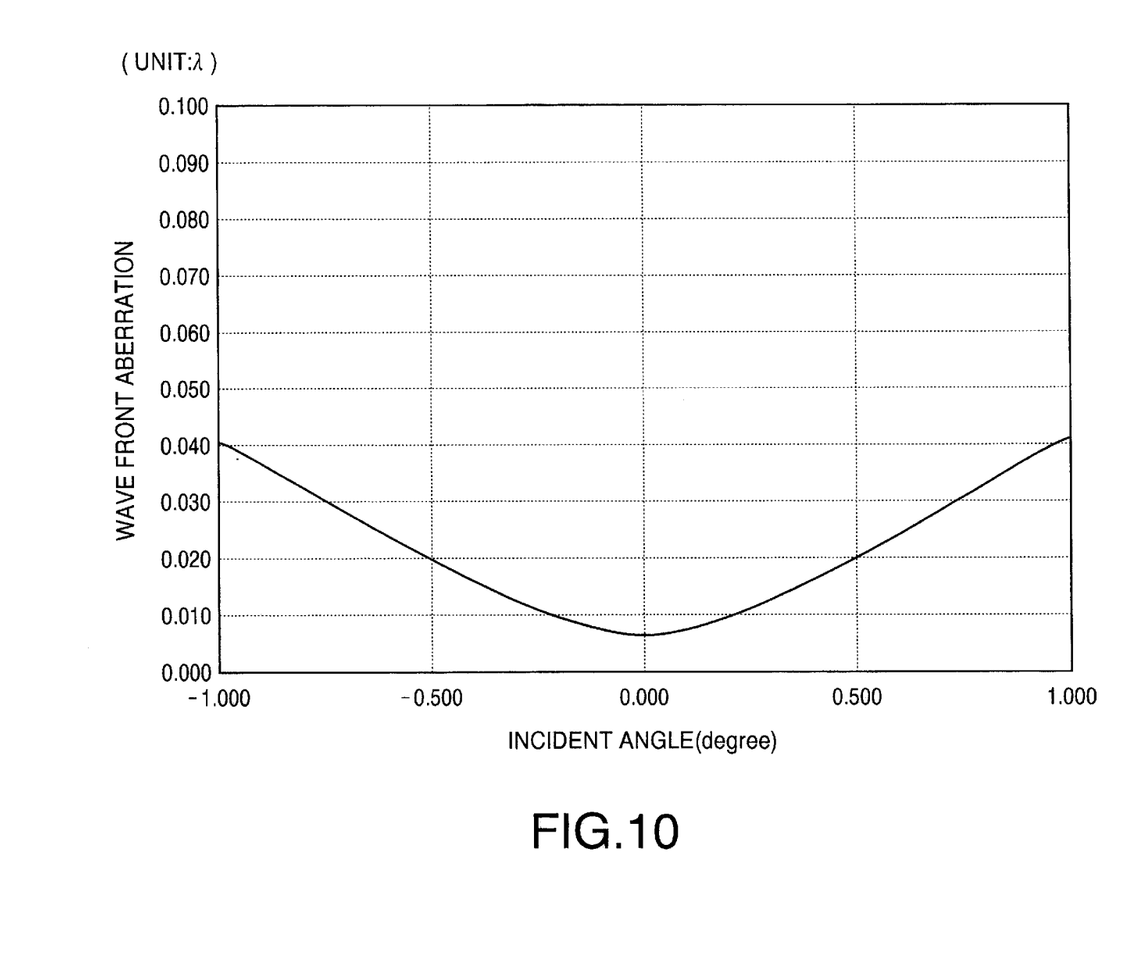
FIG. 10 shows a relationship between an angle of incidence of a beam with respect to the objective lens and wave front aberration when a second disc is used.

FIG. 10 shows a relationship between an angle of incidence of a beam emitted by the second laser diode 11b with respect to the objective lens 20 and wave front aberration (rms value) when the second disc D2 is used. For the second optical disc D2, coma is not compensated. Thus, the wave front aberration increases as the absolute value of the incident angle increases. The wave front aberration reaches the upper limit of $0.030\lambda$ [rms] at the incident angle of ±0.67°. Thus, the wave front aberration is suppressed within the allowable range if the incident angle is within the above range.

Figure 11:
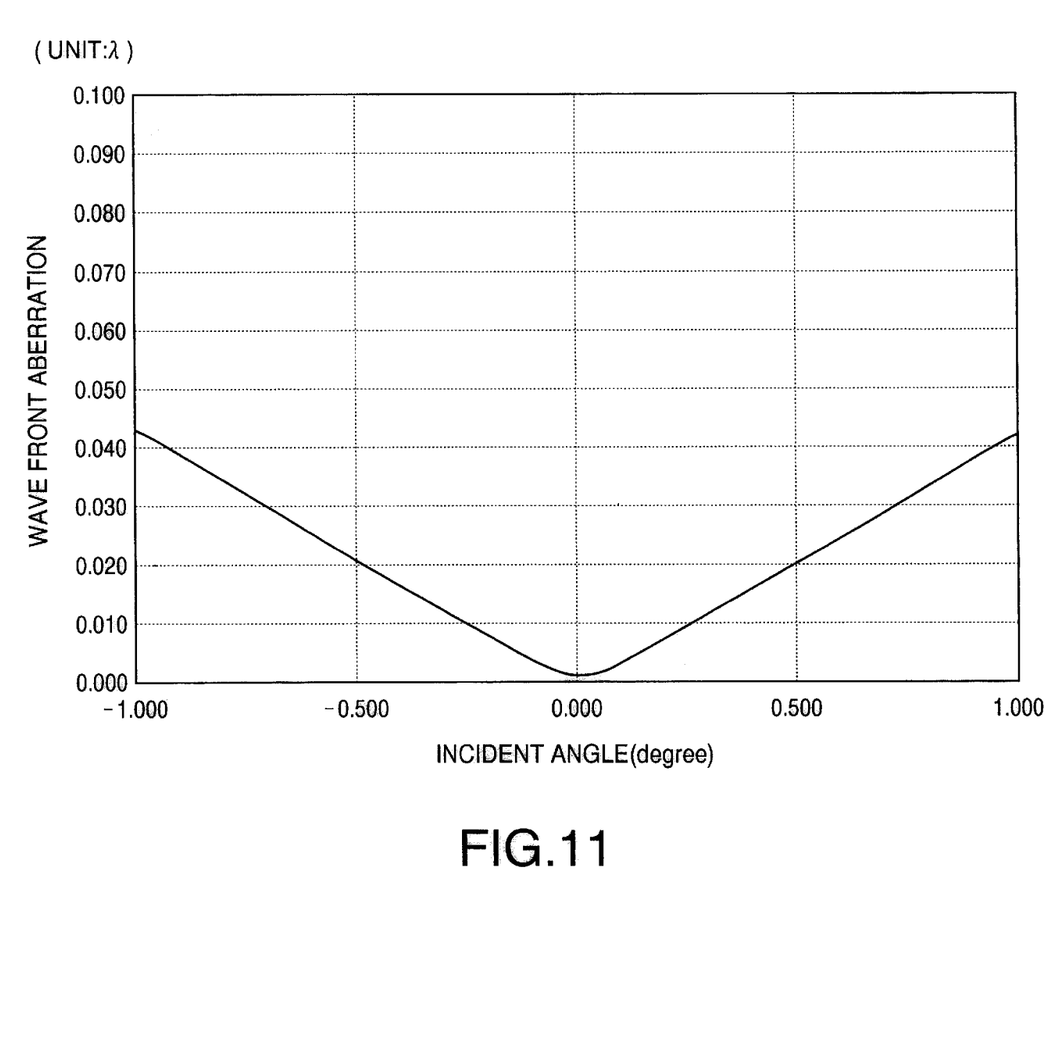
FIG. 11 shows a relationship similar to FIG. 10 except that on-axis astigmatism is removed.

If the objective lens 20 is configured not to provide the astigmatism, the wave front aberration for the second disc D2 is as shown in FIG. 11. In this case, the wave front aberration reaches the upper limit of $0.030\lambda$ when the incident angle is ±0.68°. Thus, when the second disc D2 is used, there is little difference between a case where the objective lens provides the astigmatism, and a case where the objective lens does not provide the astigmatism.

If the on-axis astigmatism is not provided, the upper limit of the incident angle for keeping the wave front aberration less than $0.030\lambda$ for either of the optical discs D1 and D2 are used, is 0.73°+0.68°=1.41°. That is, if a difference between the incidence angles of the first laser and the second laser is greater than 1.41°, a beam spot cannot be made sufficiently small for at least one of the first and second optical discs D1 and D2.

If the on-axis astigmatism is provided as in the embodiment, the upper limit of the incident angle for keeping the wave front aberration less than $0.030\lambda$ for either of the optical discs D1 and D2 are used, is 0.88°+0.67°=1.55°. Thus, the allowable difference between the incident angles of the first and second laser beams is greater. Such a configuration can be applied when the two laser diodes are arranged spaced from each other in order to increase the output intensity of the laser diodes.

When a distance between the light emitting points is 400 μm, and the focal length of the collimating lens is 23 mm, the difference of the incident angles of the two laser beams is 0.75°. In this case, the astigmatism needs not be provided.

However, when the astigmatism is not provided, the range of the incident angle is relatively small, and therefore, a relatively high positional accuracy is required. Further, if the arrangement of the laser diodes are determined with the allowable range of the wave front aberration of $0.030\lambda$, a resultant wave front aberration may exceed the allowable range due to the manufacturing/assembling errors of optical elements.

If the astigmatism is provided by the objective lens 20, it becomes possible to suppress the wave front aberration not more than $0.020\lambda$ for either of the discs, which increases the allowable manufacturing/assembling errors for the other optical elements.

In the above described embodiment, the astigmatism is generated by forming the second surface of the objective lens as a modified toric surface. However, the invention is not limited to such a configuration. For example, if the objective lens is to be manufactured by an injection molding process, the second surface may be designed as a rotationally symmetrical surface, but generates the astigmatism by adjusting various conditions of the molding process, such as temperature distribution of the mold, adjustment of the temperature of injected resin material, or the like.

The present disclosure relates to the subject matter contained in Japanese Patent Application No. 2000-306983, filed on Oct. 6, 2000, which is expressly incorporated herein by reference in its entirety.

What is claimed is:

1. An objective lens for an optical head, said objective lens converging first and second laser beams on first and second optical discs, respectively, the first laser beam having a shorter wavelength than the second laser beam, a protective layer of the first disc being thinner than a protective layer of the second optical disc, wherein said objective lens is compensated for astigmatism with respect to the first beam, which is incident on said objective lens as an off-axis beam at a predetermined incident angle, by providing on-axis astigmatism corresponding to wave front aberration greater than or equal to $0.01\lambda$ (rms), and wherein said objective lens is configured such that coma is compensated better in a case where the first laser beam is converged on the first optical disc than in a case where the second laser beam is converged on the second optical disc.

2. The objective lens according to claim 1, which is an infinite-conjugate system that receives the first and second laser beams as parallel light fluxes and converges the received parallel light fluxes on the first and second optical discs, respectively.

3. The objective lens according to claim 1, which is formed with a diffraction lens structure on one of refraction surfaces of said objective lens, said diffraction lens structure is configured such that spherical aberration is changed in an under corrected direction as a wavelength of a beam passing therethrough increases.

4. An optical head for an optical disc drive, comprising:

a first laser diode that emits a first laser beam;

a second laser diode that emits a second laser beam, a wavelength of said first laser beam being shorter than a wavelength of said second laser beam; and an objective lens that converges said first and second laser beams on first and second optical discs, respectively, a protective layer of the first disc being thinner than a protective layer of the second optical disc, wherein said objective lens is compensated for astigmatism with respect to the first beam, which is incident on said objective lens as an off-axis beam at a predetermined incident angle, by providing on-axis astigmatism corresponding to wave front aberration greater than or equal to $0.01\lambda$ (rms), wherein said objective lens is configured such that coma is compensated better in a case where the first laser beam is converged on the first optical disc than in a case where the second laser beam is converged on the second optical disc, and wherein said first laser diode and said second laser diode are arranged such that converging points, on which said first laser beam and said second laser beam are converged by said objective lens, are aligned in a direction in which one of two focal lines, which would be formed when light fluxes parallel with the optical axis of the objective lens are incident on said objective lens, closer to said objective lens extends.

5. The optical head according to claim 4, which is an infinite-conjugate system that receives the first and second laser beam as the parallel light fluxes and converges the received parallel light fluxes on the first and second optical discs, respectively.

6. The optical head according to claim 4, which is formed with a diffraction lens structure on one of refraction surfaces of said objective lens, said diffraction lens structure is configured such that spherical aberration is changed in an under corrected direction as a wavelength of a beam passing therethrough increases.

7. The optical head according to claim 4, wherein said first laser diode and said second laser diode are incorporated in a single unit.

8. The optical head according to claim 4, wherein light emitting points of said first and second laser diodes are aligned at off-axis positions with respect to the optical axis of said objective lens.

9. An optical disc drive, comprising:

a spindle motor that is capable of rotating either one of a first optical disc and a second optical disc;

an optical head, which includes:

a first laser diode that emits a first laser beam;

a second laser diode that emits a second laser beam, a wavelength said first laser beam being shorter than a wavelength of said second laser beam; and an objective lens that converges said first and second laser beams on first and second optical discs, respectively, a protective layer of the first disc being thinner than a protective layer of the second optical disc, wherein said objective lens is compensated for astigmatism with respect to the first beam, which is incident on said objective lens as an off-axis beam at a predetermined incident angle, by providing on-axis astigmatism corresponding to wave front aberration greater than or equal to $0.01\lambda$ (rms), wherein said objective lens is configured such that coma is compensated better in a case where the first laser beam is converged on the first optical disc than in a case where the second laser beam is converged on the second optical disc, and wherein said first laser diode and said second laser diode are arranged such that converging points, on which said first laser beam and said second laser beam are converged by said objective lens, are aligned in a direction in which one of two focal lines, which would be formed when light fluxes parallel with the optical axis of the objective lens are incident on said objective lens, closer to said objective lens extends; and a head driving mechanism that drives at least a part of said optical head in a radial direction of the one of said first and second optical disc, wherein an extending direction of said focal line closer to said objective lens coincides with a tangential line to said one of said first and second optical disc.

* * * * *